Jan. 4, 1955 H. A. REISE 2,698,922

SINGLE-SIDED PUSH-PULL AMPLIFIER

Filed June 3, 1948 3 Sheets-Sheet 1

INVENTOR
H. A. REISE

BY N. S. Ewing
ATTORNEY

Jan. 4, 1955 H. A. REISE 2,698,922

SINGLE-SIDED PUSH-PULL AMPLIFIER

Filed June 3, 1948 3 Sheets-Sheet 2

INVENTOR
H. A. REISE

BY N. S. Ewing
ATTORNEY

Jan. 4, 1955

H. A. REISE 2,698,922

SINGLE-SIDED PUSH-PULL AMPLIFIER

Filed June 3, 1948

3 Sheets-Sheet 3

INVENTOR
H. A. REISE

BY

N. S. Ewing
ATTORNEY

United States Patent Office 2,698,922

Patented Jan. 4, 1955

2,698,922

SINGLE-SIDED PUSH-PULL AMPLIFIER

Herman A. Reise, West Orange, N. J., assignor to Bell Telephone Laboratories, Incorporated, New York, N. Y., a corporation of New York Application June 3, 1948, Serial No. 30,849

18 Claims. (Cl. 332—50)

This invention relates primarily to amplifiers employing at least two electron tubes and more particularly to amplifiers having at least two electron tubes operating in a push-pull relationship.

One object of the invention is to minimize the phase shift occurring in the output circuits of push-pull type amplifiers.

Another and more particular object is to facilitate the use of feedback in push-pull type amplifiers in instances where the amount of feedback used is normally limited by the amount of phase shift occurring in the output transformers.

A problem encountered in the design of a conventional push-pull amplifier is that of phase shift in the output transformer. Such phase shift is often objectionable, particularly when it is desirable to apply, to the input circuit of the amplifier, feedback which is derived from any point beyond the primary side of the output transformer. If a substantial amount of feedback is to be used, the output transformer could, perhaps, be designed to introduce low values of phase shift at sufficiently high frequencies. However, such a transformer would probably not be feasible from either an engineering or an economic standpoint. In many applications, therefore, it is advantageous to make use of a circuit which, while retaining most of the advantage of normal push-pull operation, introduces only a minimum amount of phase shift.

When an output transformer is used with a conventional push-pull amplifier, phase shift is usually introduced by flux leakage in the transformer and by distributed capacitances in the windings. In accordance with the present invention, one electron tube of a conventional push-pull amplifier is, in effect, moved from the negative to the positive side of its plate supply source and functions as a cathode follower. The other tube remains undisturbed and appropriate input circuits are added to amplify and reverse the phase of the signal as applied to the tube acting as a cathode follower. When an output transformer having a unity winding ratio is used, the two individual windings on the primary side are each coupled capacitatively to the secondary winding, thus placing the respective windings essentially in parallel with respect to alternating current. The windings are thereby caused to maintain substantially identical phase and amplitude relationships, and phase shift caused by flux leakage is practically eliminated. The tubes furnish an output to the individual primary windings which is single-sided, or unbalanced, with respect to ground, as contrasted from the balanced output condition existing in a conventional push-pull circuit. As a result, the voltage appearing at any instant across the entire primary of the output transformer of an amplifier in accordance with the present invention is reduced to approximately half of that appearing in a conventional circuit, reducing the effect of the distributed capacitances of the windings and reducing the phase shift introduced by such capacitances.

Embodiments of the present invention are particularly applicable to modulation systems. When a conventional push-pull amplifier is used to supply an audio frequency signal to a modulation system, feedback is often limited, by phase shift in the push-pull output transformer, to the audio circuit alone. Feedback is then usually derived from only the primary side of the push-pull output transformer, and hence does not correct for distortion and noise in the carrier, or radio frequency, stages. In accordance with the present invention, feedback may be obtained, without undue difficulty, from the radio frequency stages as well as from the audio stages of the modulation system.

The nature of the invention will be more thoroughly understood after a study of the following detailed description and the attached drawings, in which.

Figure 1:
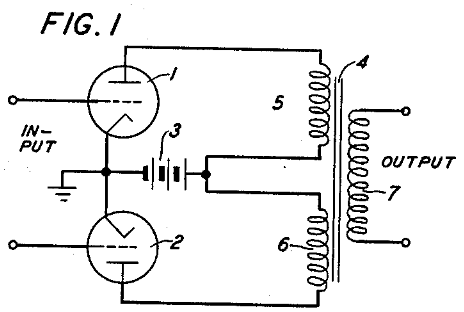
Fig. 1 illustrates a portion of a conventional push-pull amplifier.

Referring particularly to Fig. 1, a portion of a conventional push-pull amplifier circuit is shown for the purpose of simplifying, by comparison, the explanation of the principles of operation of the various embodiments of the present invention. The cathodes of two electron tubes 1 and 2 are connected together and grounded. An incoming signal passes through an appropriate input circuit and is impressed upon the control grids of tubes 1 and 2. The negative terminal of a plate supply source 3 is grounded. An output transformer 4 has its primary side divided into a pair of individual windings 5 and 6, one of which, 5, is connected between the plate of tube 1 and the positive terminal of the plate supply source 3. The other winding 6 is connected between the positive side of source 3 and the plate of tube 2. The amplified signal or output appears across the secondary winding 7 of transformer 4.

Figure 2:
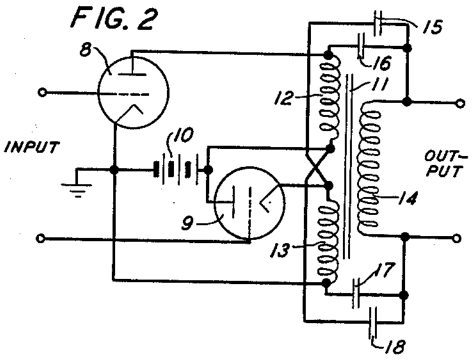
Fig. 2 represents a portion of a push-pull type amplifier in accordance with the invention.

In Fig. 2, an incoming signal passes through an appropriate input circuit and is impressed upon the control grids of two electron tubes 8 and 9. The cathode of tube 8 is grounded and connected to the negative terminal of a plate supply source 10. The plate of tube 9 is connected to the positive terminal of source 10. As in Fig. 1, an output transformer 11 has its primary divided into a pair of individual windings 12 and 13. Winding 12 is connected between the plate of tube 8 and the positive side of source 10 and winding 13 is connected between the cathode of tube 9 and ground. The amplified signal or output appears across the secondary winding 14 of transformer 11. The operation of tube 8 is similar to that of tube 1 in Fig. 1. Tube 9, however, occupies a different position in the circuit from that of tube 2 and operates as a cathode follower, winding 13 constituting its cathode output circuit. Therefore, while a portion of the input circuit of Fig. 2 has been omitted for the sake of comparison with Fig. 1, it is contemplated that it generally will include means for amplifying and reversing the phase of the signal as applied to the grid of tube 9. Such means will be shown in detail in subsequent figures. In the circuits of both Fig. 1 and Fig. 2, the input terminals are, in general, of opposite polarity.

In the circuit shown in Fig. 1, the input to windings 5 and 6 is balanced. The ends of windings 5 and 6 which are connected to the positive terminal of source 3 are fixed in potential. When tubes 1 and 2 are biased for class A operation, the plate current in one tube increases while that in the other decreases. When tubes 1 and 2 are biased for class AB, B, or C operation, each tube passes no plate current for various portions of each cycle of the applied signal. Their operation, however, is still essentially push-pull. As a result, during all classes of operations the voltage appearing at any instant between the plates of tubes 1 and 2, or across the entire primary of transformer 4, is substantially double the voltage appearing across either of windings 5 or 6.

In the circuit shown in Fig. 2, on the other hand, the input to windings 12 and 13, which correspond to windings 5 and 6, respectively, is single-sided, or unbalanced, with respect to ground. Winding 12 is energized in much the same manner as was winding 5. However, the alternating current ground of winding 13 is at the opposite end of the winding from that of winding 6 in Fig. 1. The grounded end of winding 13 is the same alternating potential as that end of winding 12 which is connected to the positive terminal of source 10. During all classes of operation, therefore, the voltage appearing between the plate of tube 8 and ground, or across the entire primary of transformer 11, is substantially equal to that appearing across either winding 12 or 13.

When transformer 11 has unity ratio windings, windings 12 and 13 may be capacitatively coupled to winding 14, as indicated in Fig. 2. A condenser 15 and a condenser 16 are connected between one side of winding 14 and the cathode of tube 9 and the plate of tube 8, respectively. A condenser 17 and a condenser 18 are connected between the other side of winding 14 and ground and the positive terminal of source 10, respectively. Condensers 15, 16, 17, and 18 block direct current and serve to pass alternating current comparatively freely. Since the voltages across windings 12 and 13 are substantially in phase, these connections may be readily made if the winding ratio of transformer 11 is unity. If the winding ratio is other than unity equipotential points along the respective windings may be connected through blocking condensers.

The capacitative coupling of unity ratio windings causes them to be effectively in parallel with respect to alternating current. Phase shift between windings 12, 13, and 14 which is introduced by flux leakage is thus practically eliminated. When transformer ratios other than unity are used and equipotential points are capacitatively coupled, such phase shift is substantially reduced. Condensers 15, 16, 17, and 18, of course, may be connected between the ends of windings 12, 13, and 14 in many ways other than that shown and described as long as the windings are placed in parallel with each other with respect to alternating current.

Phase shift which is introduced by the distributed capacitances of windings 12, 13, and 14 is also substantially reduced in the embodiment shown. Since the total alternating component of voltage across the primary side of transformer 11 is considerably smaller than that across the primary of transformer 4 of Fig. 1, the effect of the distributed capacitances is also reduced, causing a reduction in the resulting phase shift.

Because windings 12, 13, and 14 are essentially in parallel with respect to alternating current, a high degree of inductive coupling is usually unnecessary. Therefore, simple inductance coils may be used in some embodiments, with little or no inductive coupling. It is conceivable that other types of impedance elements be used, although certain other difficulties would very likely be introduced. When a transformer is used, the lack of a necessity for close coupling between windings allows a greater amount of insulation to be used. The increased insulation and the smaller alternating voltage appearing across the transformer primary, tend to improve prospects for longer transformer life. Since close coupling is not required the transformer can be designed for a lower effective shunt capacity, which is desirable from the phase shift standpoint.

Figure 3:
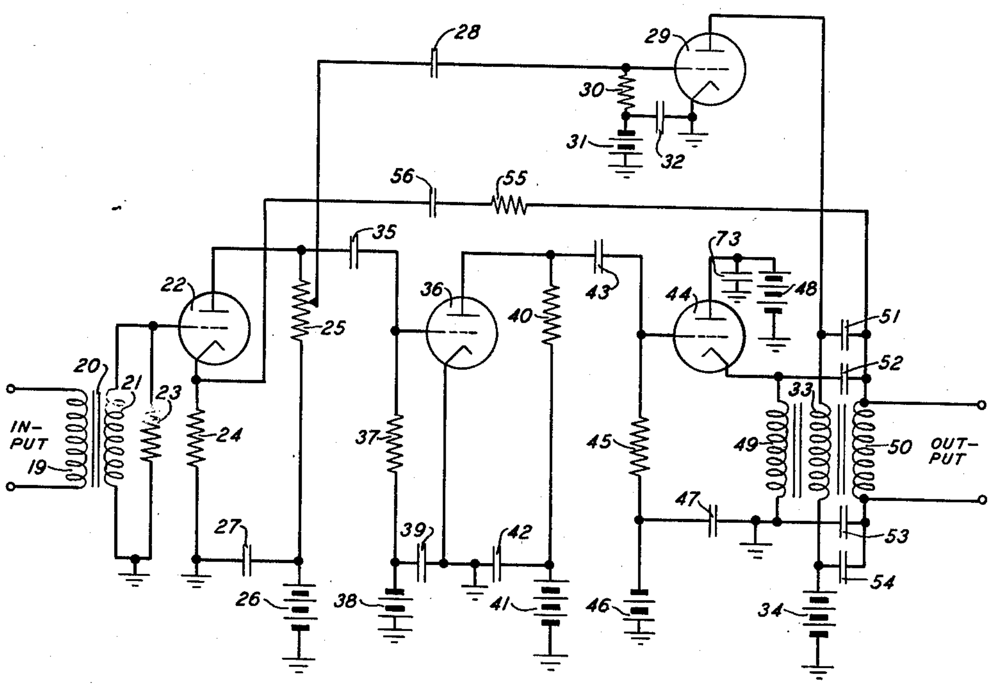
Fig. 3 shows a specific embodiment of the invention.

The specific embodiment of the invention which is shown in Fig. 3 includes a negative feedback circuit which may or may not be used, depending on the requirements of the individual circuit. In Fig. 3, a signal is applied to the primary winding 19 of an input transformer 20. One end of the secondary winding 21 is grounded and the other end is connected to the grid of a tube 22. A transformer terminating resistor 23 is connected in parallel with winding 21. Tube 22 is biased by resistor 24 which is connected between the cathode and ground. A plate resistor 25, which includes a variable tap, is connected between the plate of tube 22 and the positive side of a plate supply source 26. The negative side of source 26 is grounded and a condenser 27 is connected between the positive side and ground for the purpose of bypassing alternating current. Tube 22 serves to amplify the incoming signal and to supply the amplified signal to subsequent stages.

The variable tap on plate resistor 25 is connected through a coupling condenser 28 to the grid of a tube 29. Tube 29 is biased through a resistor 30 by means of a battery 31, resistor 30 and battery 31 being connected in series between the grid of tube 29 and ground. Battery 31 is bypassed to ground by means of a condenser 32. The cathode of tube 29 is grounded and the plate is connected to one side of an output coil 33. A plate supply source 34 is connected between the other side of coil 33 and ground.

The plate of tube 22 is connected through a coupling condenser 35 to the grid of a tube 36, the cathode of which is grounded. A grid resistor 37 is connected between the grid of tube 36 and the negative terminal of a bias battery 38. The positive terminal of battery 38 is grounded. A bypass condenser 39 is connected in parallel with battery 38. A plate resistor 40 is connected between the plate of tube 36 and the positive side of a plate supply source 41. Source 41 is shunted by bypass condenser 42 and its negative side is grounded.

Tube 36 amplifies and reverses the phase of the signal received from tube 22. The output of tube 36 is applied, through a coupling condenser 43, to the grid of a tube 44. Tube 44 is biased through a resistor 45 by a battery 46, resistor 45 and battery 46 being connected in series between the grid and ground. Battery 46 is shunted by a bypass condenser 47. The negative side of a plate supply source 48 is grounded and the positive side is connected to the plate of tube 44. Battery 48 is shunted by a bypass condensor 73. An output coil 49 is connected between the cathode of tube 44 and ground. The final amplified signal voltage appears across a coil 50 which may be inductively coupled to coils 33 and 49. Coupling condensers 51 and 52 are connected from one side of coil 50 to the plate of tube 29 and to the cathode of tube 44, respectively. Coupling condensers 53 and 54 are connected from the other side of coil 50 to ground and to the positive side of source 34, respectively. If it is desirable to use negative feedback, it can be provided by connecting a resistor 55 and a condenser 56 in series between one side of coil 50 and the cathode of tube 22.

Tubes 29 and 44 correspond to tubes 8 and 9, respectively, of Fig. 2 and operate in the same manner. Coils 33, 49, and 50 correspond to windings 12, 13, and 14, respectively. As with the windings in Fig. 2, coils 33, 49, and 50 may constitute the windings of a transformer, or may have little or no inductive coupling, depending upon the particular requirements of the individual installation. An appropriate source of direct voltage may, of course, supply the voltages which have been indicated by separate grid bias batteries and plate supply sources in Fig. 3.

For proper operation of tubes 29 and 44, their respective outputs should generally be equal or balanced. The tap shown on plate resistor 25 provides a method for adjusting for a proper balance. Somewhat similar results may be obtained, however, by properly choosing amplifier tube 36 and its output circuit in order to obtain the required additional gain required by the cathode follower stage 44. It should also be noted that inductance coils should generally be used in place of resistors 30 and 45 if the grids of tubes 29 and 44 are driven positively, in order to provide lower resistance paths for the direct grid current. When the grids are not driven positively, resistors are suitable.

Figure 4:
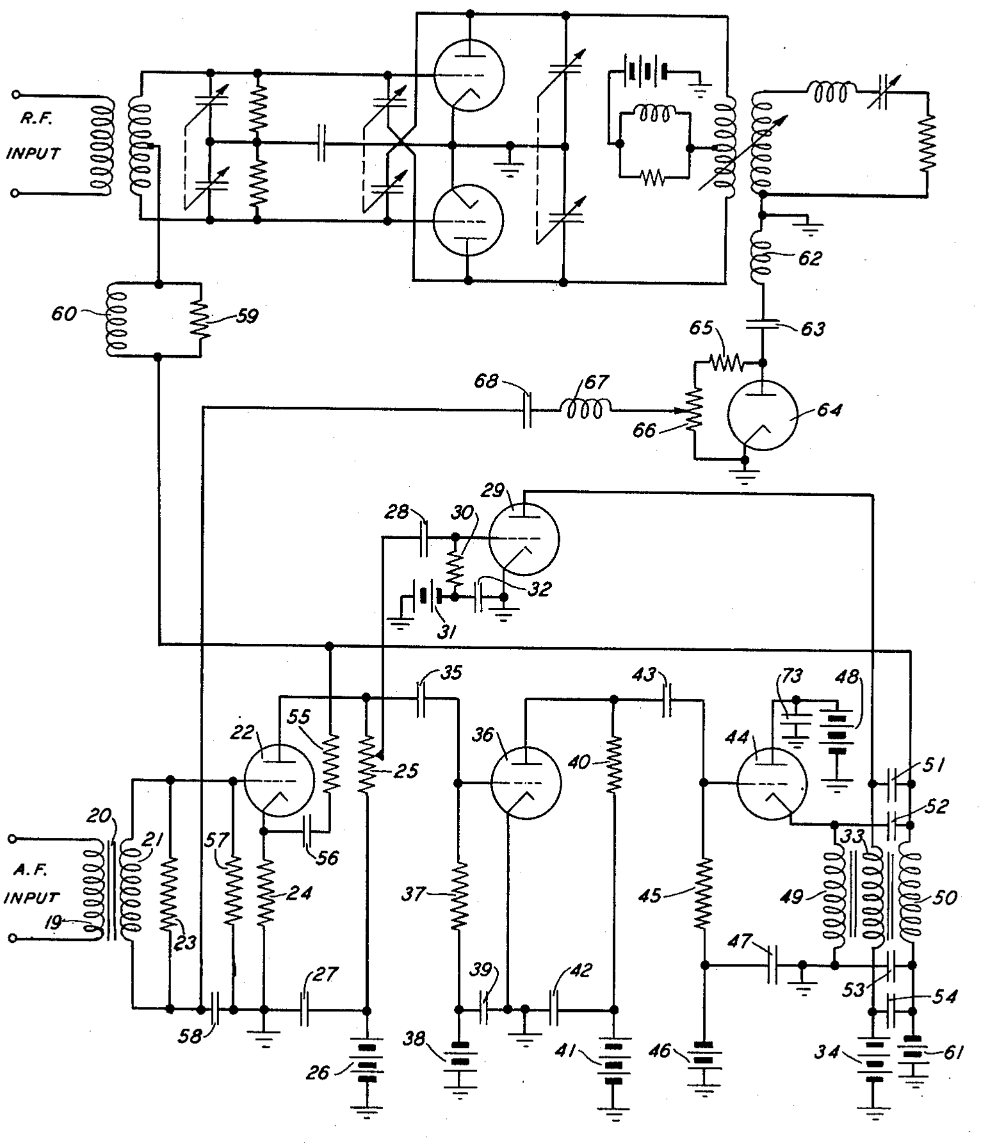
Fig. 4 and Fig. 5 illustrate specific embodiments of the invention as applied to grid bias and plate modulated systems, respectively.

In Fig. 4, the amplifier of Fig. 3 is shown supplying an audio frequency signal to a grid bias modulated radio broadcasting transmitter. In Fig. 4, a resistor 57 is connected between the grid of tube 22 and ground and a radio frequency bypass condenser 58 is connected between ground and the side of winding 21 which was grounded in Fig. 3. The rest of the amplifier circuit is unchanged. One side of coil 50 is connected to a parallel combination of a resistor 59 and an inductance 60, which is, in turn, connected to the center point of the secondary of the carrier or radio frequency input transformer. The other side of coil 50 is connected to the negative terminal of a grid bias battery 61. The positive terminal of battery 61 is grounded.

Negative feedback is derived from the output circuit of the modulator. A coil 62 is inductively coupled with the output transformer of the modulator and is connected through a condenser 63 to the plate of a rectifier tube 64. The cathode of rectifier tube 64 is grounded, as is the other end of coil 62. A resistor 65 and the resistance arm of a potentiometer 66 are connected in series between the plate and cathode of rectifier tube 64. A portion of the carrier wave, modulated by an audio frequency signal which is introduced into the primary 19 of transformer 20, appears across coil 62. That portion of the modulated wave is rectified by rectifier tube 64 and the audio frequency envelope is fed back through the movable arm of potentiometer 66, through a radio frequency choke 67, and through a coupling condenser 68 to a point between the secondary winding 21 of transformer 20 and condenser 58. The audio frequency output of this feedback circuit is, in effect, in series with the secondary 21 of audio input transformer 20. The effective voltage to the grid of tube 22 is, therefore, the difference between the two voltages. A measure of correction for distortion and noise in the carrier or radio frequency circuit is thus introduced.

Figures 5, 6:
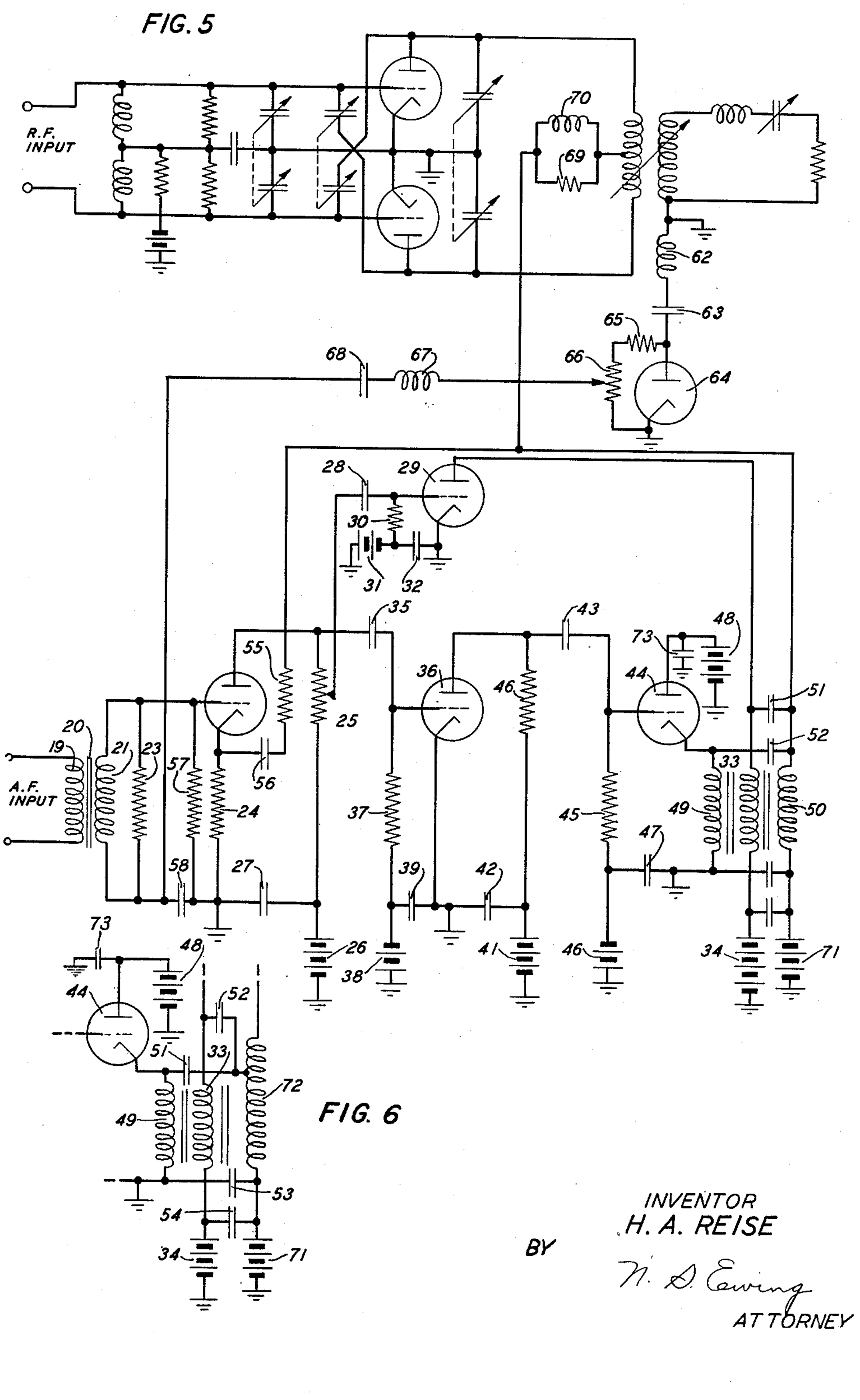
Fig. 6 shows an alternative output circuit for the push-pull stage of Fig. 5.

In Fig. 5, the amplifier of Fig. 3 is shown supplying an audio signal to a plate modulated radio broadcasting transmitter. The operation of the feedback network corresponds to that described in Fig. 4. Here, however, one end of coil 50 is connected to one side of the parallel combination of a resistor 69 and an inductance 70, the other side of which is connected to the mid-point of the primary of the radio frequency output transformer. The other end of coil 50 is connected to the positive terminal of a plate supply source 71. The negative terminal of source 71 is grounded.

In the circuit of Fig. 5, approximately thirty per cent more voltage is required from sources 34 and 48 than from source 71. One method of eliminating the need for sources having different output voltages is shown in Fig. 6. The circuit shown there may be substituted for the push-pull output circuit of Fig. 5. An extended coil 72 is substituted for coil 50 and condensers 51 and 52 are connected to a point on coil 72 which corresponds to the end point of coil 50. Unity winding ratios are thus preserved and the extended portion of coil 72 provides the necessary thirty per cent voltage increase. The voltage furnished by the plate supply source 71 may now be approximately equal to that furnished by sources 34 and 48.

Although the invention has been described largely with reference to certain specific embodiments, various other embodiments and modifications, within the spirit and scope of the appended claims, will occur to those skilled in the art.

What is claimed is:

1. In combination, a pair of electron tubes each including a cathode, a plate, and a control grid, a common input circuit for said pair of tubes which is unbalanced with respect to ground, individual input circuits for each of said tubes branching from said common input circuit, individual output circuits for each of said tubes, one of said individual output circuits being located in the plate circuit of one of said tubes and the other being common to both the plate and grid circuits of the other of said tubes, and a common output circuit for said tubes which is unbalanced with respect to ground, said common output circuit being coupled capacitatively to each of said individual output circuits.

2. A combination, in accordance with claim 1, including negative feedback means connected between said common output circuit and said common input circuit.

3. In combination, a pair of wave translating devices, one of said wave translating devices including a first electron tube having at least a cathode, a plate, and a control grid, said tube delivering output to an element in its plate circuit, and the other of said wave translating devices including a second electron tube having at least a cathode, a plate, and a control grid, said tube delivering output to an element common to both its plate and grid circuits, a common input circuit for said pair of wave translating devices which is unbalanced with respect to ground, individual input circuits for each of said devices branching from said common input circuit, and a common output circuit for said pair of wave translating devices which is unbalanced with respect to ground, said common output circuit being coupled capacitatively tc the output receiving elements of each of said wave translating devices.

4. A combination, in accordance with claim 3, including negative feedback means connected between said common output circuit and said common input circuit.

5. In combination, a pair of electron tubes each including a cathode, a plate, and a control grid, a common input circuit for said pair of tubes, a signal source, means for supplying signal waves from said source to said common input circuit, a phase inverter separate and distinct from said tubes located between said common input circuit and one of said tubes, a pair of inductance coils, one of said coils being located in the plate circuit of one of said tubes and the other of said coils being common to both the plate and grid circuits of the other of said tubes, and an output inductance coil, said output coil and said pair of coils being capacitatively coupled substantially in parallel with each other.

6. In combination, a pair of electron tubes each including a cathode, a plate, and a control grid, a common input circuit for said pair of tubes, a signal source, means for supplying signal waves from said source to said common input circuit, a phase inverter separate and distinct from said tubes located between said common input circuit and one of said tubes, and a multiwinding transformer, one winding being located in the plate circuit of one of said tubes, a second winding being common to both the plate and grid circuits of the other of said tubes, and a third winding being capacitatively coupled substantially in parallel with said first and second windings, thereby serving as an output winding.

7. In combination, a pair of amplifying devices, one of said amplifying devices including a first electron tube having at least a cathode, a plate, and a control grid, said tube delivering output to an element in its plate circuit, and the other of said amplifying devices including a second electron tube having at least a cathode, a plate, and a control grid, said tube delivering output to an element common to both its plate and grid circuits, said amplifying devices being connected in such a manner that the plate current in one of said tubes decreases or is zero while the plate current in the other of said tubes increases, and increases or is zero while the plate current in the other of said tubes decreases, a common input circuit for said pair of amplifying devices, a signal source, means for supplying signal waves from said source to said common input circuit, a phase inverter separate and distinct from said amplifying devices located between said common input circuit and one of said amplifying devices, and a common output circuit for said pair of amplifying devices, said common output circuit being coupled capacitatively to the output receiving elements of each of said amplifying devices.

8. A combination, in accordance with claim 7, including negative feedback means connected between said common output circuit and said common input circuit.

9. In combination, a pair of amplifying devices, each of said amplifying devices including at least one electron tube having at least a cathode, a plate, and a control grid, said amplifying devices being connected in such a manner that the plate current in one of said tubes decreases or is zero while the plate current in the other of said tubes increases, and increases or is zero while the plate current in the other of said tubes decreases, a common input circuit for said pair of amplifying devices, a signal source, means for supplying signal waves from said source to said common input circuit, individual output circuits for each of said amplifying devices, and a common output circuit for said amplifying devices, one side of said common output circuit being capacitatively coupled to one side of each of said individual output circuits, and the other side of said common output circuit being capacitatively coupled to the other side of each of said individual output circuits.

10. In combination, a pair of electron tubes each including a cathode, a plate, and a control grid, a common input circuit for said pair of tubes, a signal source, means for supplying signal waves from said source to said common input circuit, means for biasing each of said tubes substantially to cut-off, a source of plate supply voltage for each of said tubes, means separate and distinct from said tubes for reversing the phase of the signal waves supplied from said common input circuit to one of said tubes, individual output circuits for each of said tubes, one of said individual output circuits being connected between the plate supply source and the plate of the first of said tubes, and the other of said individual output circuits being connected between the plate supply source and the cathode of the other of said tubes, and a common output circuit for said tubes, said common output circuit being coupled capacitatively to each of said individual output circuits.

11. In combination, a pair of electron tubes each having at least a cathode, a plate, and a control grid, a common input circuit for said pair of tubes, a signal source, means for supplying signal waves from said source to said common input circuit, individual output circuits for each of said tubes, one of said individual output circuits being located in the plate circuit of one of said tubes and the other being common to both the plate and grid circuits of the other of said tubes, means for amplifying and reversing the phase of the incoming signal as applied to the second of said tubes, and a common output circuit for said tubes, said common output circuit being coupled capacitatively to each of said individual output circuits.

12. In combination, a pair of space discharge devices each including a cathode, an anode, and a control grid, a common input circuit for said pair of devices, a pair of coils, one of said coils being located in the anode circuit of one of said devices and the other of said coils being common to both the anode and the grid circuits of the other of said devices, and an output coil, one side of each of said first-mentioned coils being coupled capacitatively to one side of said output coil, and the other side of each of said first-mentioned coils being coupled capacitatively to an intermediate point on said output coil.

13. In combination, a modulation system and means for introducing a modulating signal into said system which comprises a pair of electron tubes each having at least a cathode, a plate, and a control grid, a common input circuit for said pair of tubes, a source of said modulating signal, means for supplying signal waves from said source to said common input circuit, a phase inverter separate and distinct from said tubes connected between said common input circuit and one of said tubes, individual output circuits for each of said tubes, one of said individual output circuits being located in the plate circuit of one of said tubes and the other being common to both the plate and grid circuits of the other of said tubes, a common output circuit for said tubes, said common output circuit being coupled capacitatively to each of said individual output circuits, and connections from said common output circuit to said modulation system.

14. A combination, in accordance with claim 13, including negative feedback means connected between the output circuit of said modulation system and said common input circuit.

15. A combination, in accordance with claim 13, including negative feedback means connected between the output circuit of said modulation system and said common input circuit, and negative feedback means connected between said common output circuit for said tubes and said common input circuit.

16. In combination, a modulation system and means for introducing a modulating signal into said system which comprises a pair of wave translating devices, one of said wave translating devices including a first electron tube having at least a cathode, a plate, and a control grid, said tube delivering output to an element in its plate circuit, and the other of said wave translating devices including a second electron tube having at least a cathode, a plate and a control grid, said tube delivering output to an element common to both its plate and grid circuits, a common input circuit for said pair of wave translating devices, a source of said modulating signal, means for supplying signal waves from said source to said common input circuit, a phase inverter separate and distinct from said wave translating devices connected between said common input circuit and one of said wave translating devices, a common output circuit for said pair of wave translating devices, connections from said common output circuit to said modulation system, and negative feedback means connected between the output circuit of said modulation system and said common input circuit.

17. In combination, a modulation system and means for introducing a modulating signal into said system which comprises a pair of wave translating devices, a common input circuit for said wave translating devices, a source of said modulating signal, means for supplying signal waves from said source to said common input circuit, individual output circuits for each of said wave translating devices, a common output circuit for said wave translating devices, one side of said common output circuit being capacitatively coupled to one side of each of said individual output circuits, and the other side of said common output circuit being capacitatively coupled to the other side of each of said individual output circuits, connections from said common output circuit to said modulation system, and negative feedback means connected between the output circuit of said modulation system and said common input circuit.

18. In combination, a modulation system and means for introducing a modulating signal into said system which comprises a pair of electron tubes each having at least a cathode, an anode, and a control grid, a common signal input circuit for said pair of tubes, individual output circuits for each of said tubes, one of said individual output circuits being located in the anode circuit of one of said tubes and the other being common to both the anode and grid circuits of the other of said tubes, a common output circuit for said tubes, one side of each of said individual output circuits being capacitatively coupled to one side of said common output circuit, and the other side of each of said common output circuits being capacitatively coupled to an intermediate point on said common output circuit, thereby allowing the same voltage source to be used to supply one voltage to the anode of one of said tubes and to supply a different voltage to said modulation system, connections from said common output circuit to said modulation system, and negative feedback means connected between said modulation system and said common input circuit.

References Cited in the file of this patent

UNITED STATES PATENTS

| | | |
|---|---|---|
| 1,968,099 | Shumard | July 31, 1934 |
| 2,090,513 | Farnham | Aug. 17, 1937 |
| 2,106,226 | Schaper | Jan. 25, 1938 |
| 2,226,214 | Albrecht | Dec. 24, 1940 |
| 2,256,085 | Goodale | Sept. 16, 1941 |
| 2,338,512 | Harmon | Jan. 4, 1944 |
| 2,379,042 | Shaw | June 26, 1945 |
| 2,446,025 | Rockwell | July 27, 1948 |

FOREIGN PATENTS

| | | |
|---|---|---|
| 830,657 | France | Aug. 5, 1938 |
| 892,851 | France | May 23, 1944 |